No. 607,859. Patented July 26, 1898.
J. KELLER & C. H. HAESELER.
ENGINE.
(Application filed Feb. 7, 1898.)
(No Model.) 2 Sheets—Sheet 1.
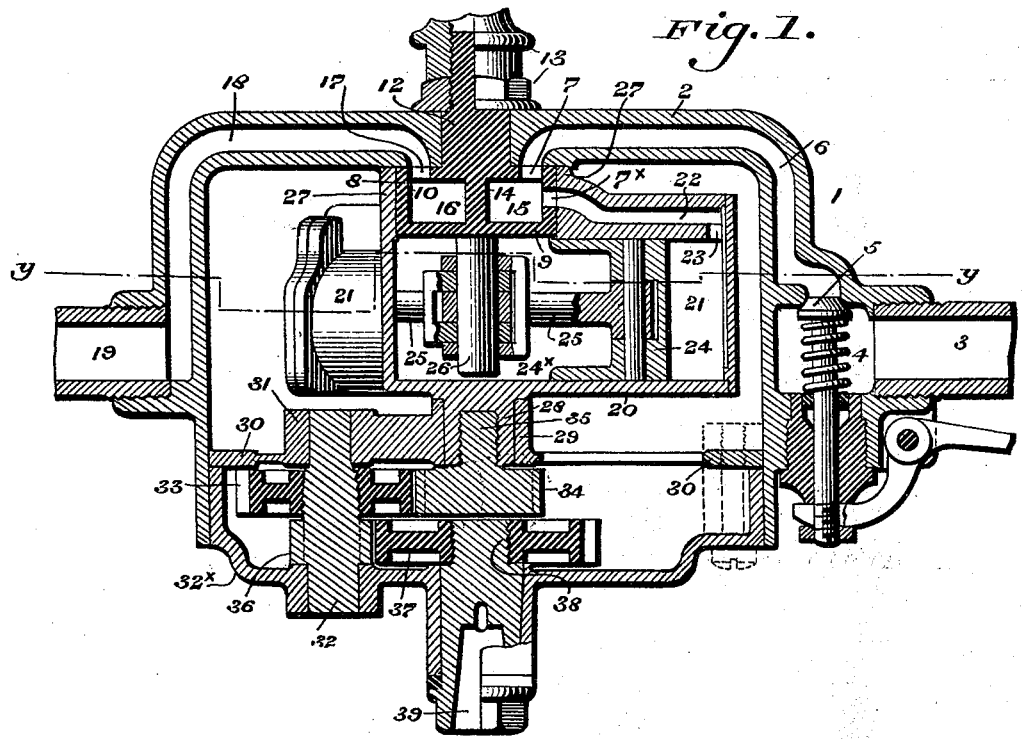
Fig. 1.
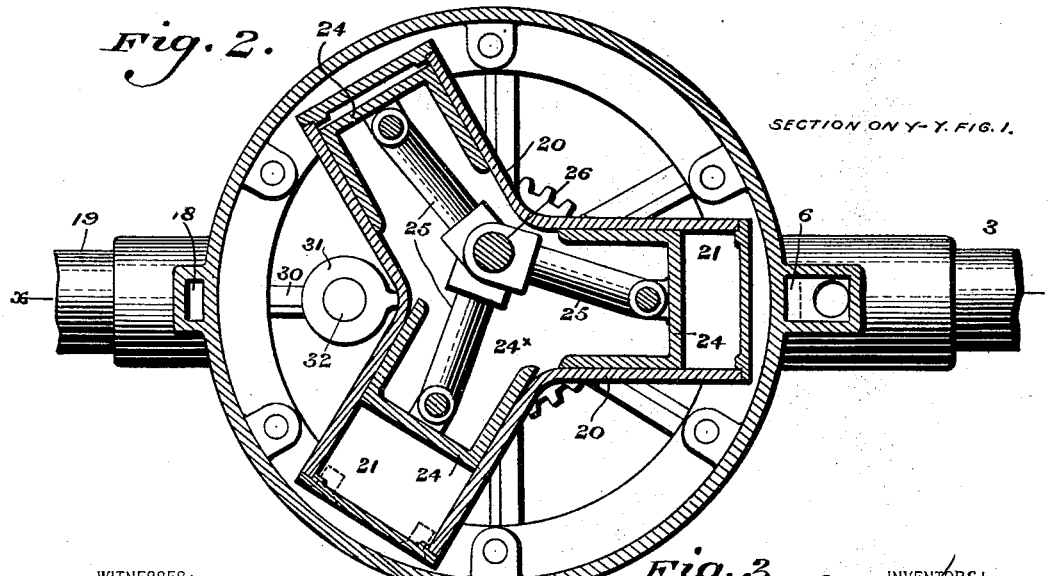
Fig. 2.
SECTION ON Y-Y. FIG. 1.
Fig. 3.
WITNESSES: INVENTORS
Julius Keller
Charles H. Haeseler
BY Niedersheim & Fairbanks
ATTORNEYS.

No. 607,859. Patented July 26, 1898.
J. KELLER & C. H. HAESELER.
ENGINE.
(Application filed Feb. 7, 1898.)
(No Model.) 2 Sheets—Sheet 2.
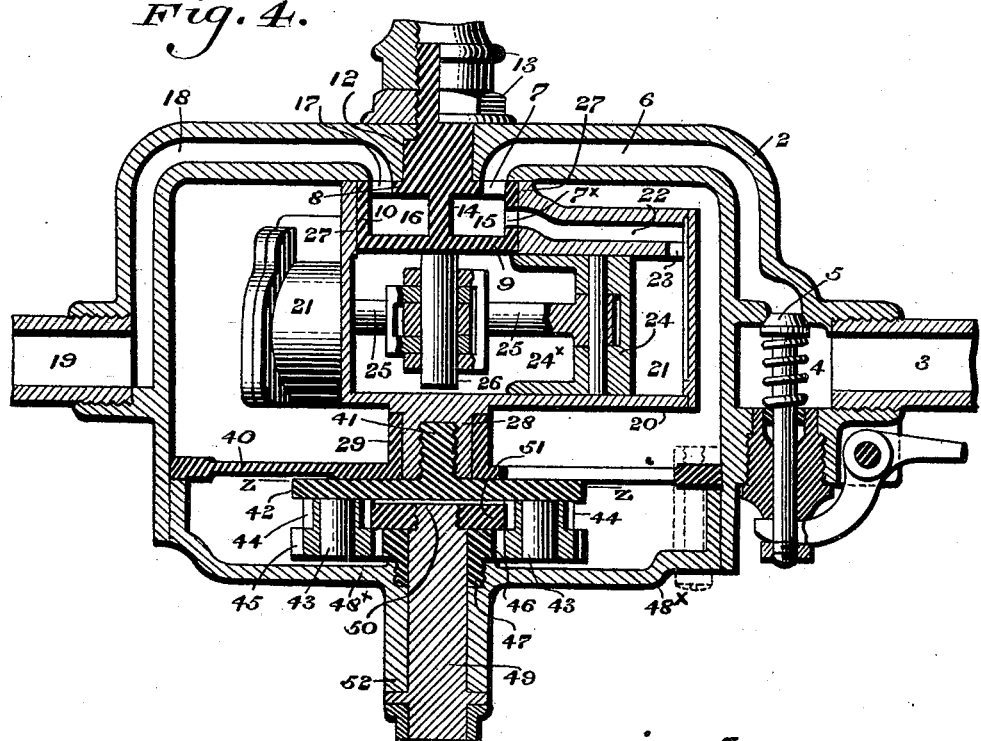
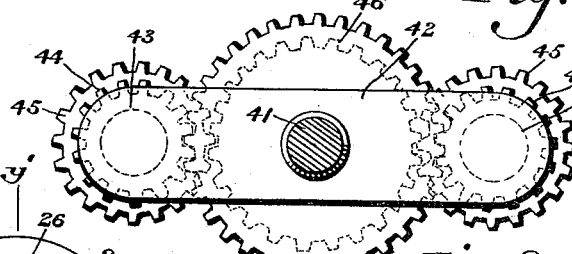
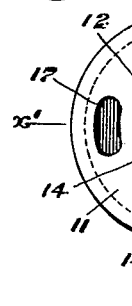
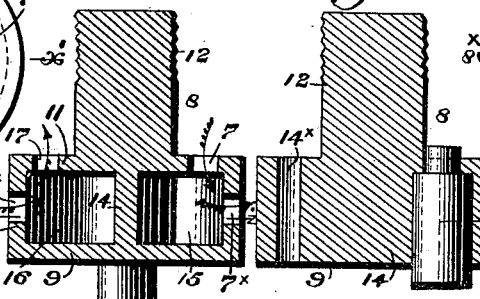
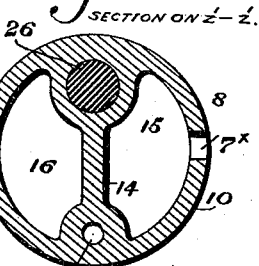
WITNESSES:
INVENTORS:
Julius Keller
Charles H. Haeseler
BY
Wiedersheim & Fairbanks
ATTORNEYS.

UNITED STATES PATENT OFFICE.

JULIUS KELLER AND CHARLES H. HAESELER, OF PHILADELPHIA, PENNSYLVANIA.

ENGINE.

SPECIFICATION forming part of Letters Patent No. 607,859, dated July 26, 1898.

Application filed February 7, 1898. Serial No. 669,358. (No model.)

*To all whom it may concern:*

Be it known that we, JULIUS KELLER and CHARLES H. HAESELER, citizens of the United States, residing in the city and county of Philadelphia, State of Pennsylvania, have invented a new and useful Improvement in Engines, which improvement is fully set forth in the following specification and accompanying drawings.

In the practical operation of high-speed engines of a rotary type, especially those which are employed for drilling and similar purposes, a great difficulty has been heretofore experienced in making provision for properly and effectively lubricating the principal operative parts, since the latter move at very high rates of speed, and the motive fluid, which is usually air and is conducted into the engine under a high pressure, has a tendency to forcibly expel the lubricant from the engine through the exhaust-passages before said lubricant is permitted to perform the function for which it is designed and applied.

By the present invention we have produced an improved construction of rotatable cylinders which revolve bodily or in unison around an eccentrically-located stem which projects from a stationary valve, the latter having a port extending therethrough, but out of communication with the chambers of said valve, which port forms a direct communication from the exterior of the engine-casing to an internal lubricant-chamber located in substantially the central portion of said cylinders, whereby the lubricant is directed upon the desired working parts of the engine, especial attention being directed to the fact that the lubricant is in no wise subjected to the direct action of the motive fluid, whereby there is no waste and none of said lubricant is under any condition liable to be expelled from the engine through the exhaust port or passages thereof; and to this end our invention consists of an improved construction of rotary engine especially adapted for drilling, boring, and similar purposes, said engine being provided with a stationary valve having a plurality of chambers therein, an eccentric stem depending from said valve, and an oil-port leading therethrough to an internal lubricant-chamber into which said stem extends, whereby the lubricant can be readily directed upon the desired working parts of the engine.

It also consists of an improved construction of stationary valve and of inlet and exhaust chambers and ports therefor, said valve serving as a bearing for the upper portion of the rotary-engine cylinders and also as conduit for the lubricant from the exterior casing to the principal operative parts of the engine.

It also consists of a novel manner of supporting the lower portion of the engine-cylinders and transmitting the power therefrom to the rotatable drill or other tool employed.

It also consists of an improved construction of power-transmission device in which a bar is employed having journals projecting therefrom, said journals being provided with pinions of different diameter which rotate in unison, one of said pinions meshing with a stationary gear while the other of said pinions meshes with a rotary gear, the latter having a rotatable tool-holding spindle attached thereto.

It also consists of a novel construction of engine-casing, having ports therein for the inlet and egress of motive fluid, the ports being so located with respect to the stationary valve employed that space and material are economized to the highest degree.

It further consists of novel details of construction, all as will be hereinafter fully set forth, and particularly pointed out in the claims.

Figure 1 represents a vertical sectional view of an engine embodying our invention, the section being taken on line $xx$, Fig. 2, certain of the parts being shown in elevation. Fig. 2 represents a transverse section on line $y\,y$, Fig. 1, certain of the parts being shown in elevation. Fig. 3 represents a side elevation, partly in section, of a feeding device adapted to be used with our invention. Fig. 4 represents a longitudinal sectional view of an engine, the lower portion thereof showing a modified construction of power-transmission devices. Fig. 5 represents a section on line $z$, Fig. 4. Fig. 6 represents a plan view of the valve employed, the same being shown in detached position. Fig. 7 represents a transverse sectional view of said valve, the section being taken on line $x'\,x'$, Fig. 6. Fig.

8 represents a transverse sectional view of the valve on line $y'\ y'$, Fig. 6. Fig. 9 represents a section on line $z'\ z'$, Fig. 7.

Similar numerals of reference indicate corresponding parts in the views.

Referring to the drawings, 1 designates an engine especially adapted for drilling purposes, the same consisting of a casing 2, having a tube or inlet 3 for the motive fluid employed, said inlet discharging into the chamber 4, in which is located a throttle-valve 5, which controls the passage 6, the latter leading to the inlet-port 7 of the valve 8, the construction of which latter will be best understood from Figs. 6 to 9, inclusive.

The valve 8 has the base 9, which is provided with the upwardly-extending annular wall 10, the outer periphery of which serves as a bearing for the upper portion of the engine-cylinders, to be hereinafter referred to.

11 designates the top of the valve, the same having the stem 12 projecting therefrom, the upper portion of said stem being threaded and projecting above the casing 2 when the parts are assembled and being engaged by the nuts or other equivalent clamping devices 13. The wall 10 of the valve is provided with the ports $7^\times$ and $8^\times$ for the admission and exhaust of the motive fluid, respectively.

14 designates a partition within the valve, thereby dividing the latter into the inlet and exhaust chambers 15 and 16, respectively, said chamber 15 being in communication with the inlet-port 7, while the chamber 16 communicates with the exhaust-port 17, the latter leading to the exhaust-passage 18, which discharges through the tube 19, it being noted that the tubes 3 and 19, which serve as inlet and exhaust passages, respectively, may also be utilized as the handles of the engine or drill.

20 designates a plurality of cylinders rotatably mounted so as to revolve in unison, said cylinders consisting of a central lubricant-chamber $24^\times$, having the extensions 21, which in the present instance are three in number and serve as the cylinders proper, it being of course understood that the latter may be increased or diminished according to requirements, each of said cylinders having the passage 22 and the port 23, leading to the outer extremity thereof, and being provided with heads, as is customary. 24 designates pistons mounted in said cylinders, each of said pistons having pivotally attached thereto one of the piston-rods 25, the other end of the latter engaging the stem 26, which is secured to the valve 28 in any suitable manner and projects eccentrically therefrom, said stem also being eccentric to the axis of rotation of the cylinders 21.

Especial attention is called to the function of the chamber $24^\times$, which is located between the pistons 24 and serves as a receptacle for the lubricant employed, whereby the engine is effectively lubricated under all conditions, as will be hereinafter explained.

The upper portion 27 of the cylinders 20 has its bearing on the outer periphery of the wall 10 of the valve 8, which latter is preferably of substantially uniform diameter, said cylinders having projecting from their lower portion the journal 28, which has its bearing in the wall 29, which in Fig. 1 forms a part of the plate or spider 30, which is suitably supported within the engine-casing, while in Fig. 4 said member 29 forms a part of the plate or spider 40, whose construction is similar to that of the plate or spider 30, (seen in Fig 1,) except that in the latter figure said spider has a thickened portion 31, which serves as a bearing for the upper extremity of the shaft 32, the lower portion of the latter having its bearing in the bottom bearing-plate $32^\times$, which is secured to the engine-casing 2 in any suitable manner.

33 designates a gear mounted on the shaft 32 and adapted to mesh with the pinion 34, which latter is provided with a stem, which is screwed into or otherwise caused to engage the journal 28.

36 designates a pinion mounted on the shaft 32 and adapted to mesh with the gear 37, which latter is secured in any suitable manner to the spindle 38, the lower portion 39 of which is provided with a chuck or other suitable device for holding the tool or drill employed.

In Fig. 4 we have shown another embodiment of the principle of our invention, the engine proper being substantially the same as the construction seen in Fig. 1, the power-transmission devices, however, being slightly modified.

The lower journal 28 of the engine-cylinders revolves in the bearing 29, said bearing projecting from the plate 40.

42 designates a bar which has the stem 41 projecting therefrom, said stem being screwed or otherwise secured to the journal 28, so as to revolve in unison therewith.

43 designates journals projecting from the bar 42, each of said journals having rotatably mounted thereon the pinions 44 and 45 of different diameters. The pinions 45 of larger diameter mesh with the stationary-gear 46, which has a threaded hub 47, the latter being screwed or otherwise secured to the bottom bearing-plate $48^\times$. The smaller pinions 44, which in each instance revolve in unison with the pinions 45, mesh with the gear 51, which is screwed or otherwise secured to the portion 50 of the spindle 49, the latter revolving within the bearing 52.

The feeding devices $52^\times$ (seen in Fig. 3) consist of a stem 53, having a threaded socket 54 for engagement with a suitable portion of the engine, said stem being threaded and adapted to engage the threaded sleeve 55, which is provided with the center 56.

The operation is as follows: The throttle-valve 5 being opened so as to permit the motive fluid to enter the passage 6, port 7, and chamber 15, it will be evident that said fluid will pass through the port $7^\times$ into the contiguous cylinder 21, and acting upon the proper piston 24 will impart rotation to the engine-cylinders, the fluid being exhausted at the proper interval through the chamber 16, port 17, and exhaust-passages 18 and 19. The rotation of the cylinders will be imparted through the medium of the journal 28 and the pinions 34, in the construction seen in Fig. 1, to the gear 33, the shaft 32 and pinion 36 to the gear 37 and the spindle 36, as is evident.

In the construction seen in Fig. 4 the rotation of the journal 28 will cause to revolve in unison with it the bar 42, which carries thereon the sets of pinions 44 and 45 of different diameters. The rotation of the bar 42 will cause said pinions 44 and 45 to have an independent rotation, by reason of their engagement with the stationary gear or rack 46, thereby imparting rotation to the gear 51 and the spindle 49, as is evident.

Especial emphasis is laid upon the manner of lubricating the engine, which will now be described, especial reference being had to Figs. 6 to 9, inclusive. The oil-port $14^\times$ in the valve 8 is in communication with the exterior of the casing 2, and oil having been poured thereinto the same can flow directly through the valve into the chamber $24^\times$, the relative position of the oil-port $14^\times$ to said chamber being readily apparent, and when the desired quantity of lubricant had been introduced into the chamber $24^\times$ the vent (not shown) in the casing 2 is closed.

It will now be apparent that the lubricant is contained within the space or chamber $24^\times$, formed between the pistons 24, and is not subjected to the motion of the motive fluid, whereby said lubricant is utilized to the fullest extent, a feature which we have found to be of great practical importance, since there is no waste of the lubricant, and the same is retained within the engine at the points where it is most essential that it should be applied—namely, within the cylinder 21 and about the eccentric-stem 26—and there is, furthermore, no liability of the lubricant being expelled from the engine, as there is no possibility of its escape from the lubricant-chamber $24^\times$ except by passing the pistons 24, which could not happen if said pistons properly fit in their respective cylinders 21.

It will be evident that slight changes may be made by those skilled in the art which will come within the scope of our invention, and we therefore desire to reserve to ourselves the right to make all such changes as are within the spirit thereof.

Having thus described our invention, what we claim as new, and desire to secure by Letters Patent, is—

1. In an engine, a plurality of rotatable cylinders, a stationary valve, ports leading from said valve to the ends of said cylinders, the substantially central portion of the latter serving as a lubricant-chamber, a port extending through said valve, but out of communication therewith to said chamber, and means for rotating said cylinders.

2. An engine consisting of a casing, a plurality of rotatable cylinders inclosed therein, a stationary valve secured to said casing, inlet and exhaust ports leading from said valve to the ends of said cylinders, a portion of said cylinders serving as a lubricant-chamber and a port extending through said valve directly to said lubricant-chamber, in combination with means for rotating said cylinders and means for transmitting power to a drill or other tool.

3. In an engine, a casing, a stationary valve located therein, an eccentric stem projecting from said valve, inlet and exhaust chambers contained within the latter, ports leading to and from said chambers, a plurality of cylinders rotatably mounted within said casing, said valve serving as a bearing for the upper portion of said cylinders, pistons located in said cylinders, piston-rods common to said pistons and eccentric stem, the substantially central portion of said cylinders forming a lubricant-chamber and a port leading from the casing of said engine through said valve to said lubricant-chamber.

4. In an engine, a casing, a valve consisting of a base, an upwardly-extending wall of substantially uniform diameter, the outer periphery thereof serving as a bearing for a plurality of cylinders adapted to rotate in said casing, an eccentrically-located stem projecting from said valve into said casing, said valve having an oil-port leading therethrough into said cylinders, pistons in said cylinders, ports and passages leading to the extremities of said cylinders, pistons in the latter, rods common to said pistons and stem, a journal depending from said cylinders, a plate in which said journal is rotatably mounted, a spindle in which the drill or tool is adapted to be held and power-transmission devices common to said journal and spindle.

5. In an engine, a casing, a plurality of cylinders rotatably mounted therein, a stationary valve located within said casing, said valve consisting of a base provided with the upwardly-extending wall 10, said wall being adapted to serve as a bearing for the upper portion of said cylinders, a top 11 for said valve, a threaded stem 12 projecting therefrom, a transverse web 14 located in said valve and adapted to divide the latter into the inlet and exhaust chambers 15 and 16, inlet and exhaust ports communicating with said chambers, an oil-port passing through said valve but out of communication therewith, said oil-port communicating with the interior of said cylinders, and means for imparting rotation thereto.

6. In an engine, cylinders adapted to rotate bodily or in unison, a stationary valve, adapted to form a bearing for the upper portion of said cylinders, an oil-port extending from the exterior of the engine through said valve into said cylinders and means for effecting the rotation of the latter.

7. In an engine, a plurality of cylinders adapted to rotate in unison, a stationary valve, forming a bearing for the upper portion of said cylinders, a lubricant-chamber, contained in substantially the central portion of said cylinders, an oil-port extending from the interior of said engine through said valve for introducing oil into said chamber, a tool-carrying spindle and power-transmission devices common to said spindle and said cylinders.

JULIUS KELLER.
CHARLES H. HAESELER.

Witnesses:
JOHN A. WIEDERSHEIM,
WM. C. WIEDERSHEIM.